(12) United States Patent
Iwanami et al.

(10) Patent No.: US 6,735,962 B2
(45) Date of Patent: May 18, 2004

(54) COMPOSITE AUXILIARY MACHINE FOR VEHICLE AND CONTROL UNIT THEREOF

(75) Inventors: Shigeki Iwanami, Okazaki (JP); Tsuneyuki Egami, Gamagori (JP); Takuo Sakai, Kariya (JP); Hironori Asa, Okazaki (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/420,267

(22) Filed: Apr. 22, 2003

(65) Prior Publication Data

US 2003/0200760 A1 Oct. 30, 2003

(30) Foreign Application Priority Data

Apr. 26, 2002 (JP) .................................... 2002-125858
Jun. 5, 2002 (JP) .................................... 2002-164359

(51) Int. Cl.[7] .............................................. B60H 1/32
(52) U.S. Cl. ........................................ 62/133; 62/323.4
(58) Field of Search .............................. 62/323.4, 133, 62/323.1, 323, 3, 228.4, 228.5, 236, 243

(56) References Cited

U.S. PATENT DOCUMENTS

| | | | | |
|---|---|---|---|---|
| 6,152,845 | A | * 11/2000 | Okada et al. | 474/93 |
| 6,234,769 | B1 | 5/2001 | Sakai et al. | |
| 6,332,842 | B1 | * 12/2001 | Tabuchi et al. | 464/33 |
| 6,351,957 | B2 | * 3/2002 | Hara | 62/133 |
| 6,640,562 | B2 | * 11/2003 | Odachi et al. | 62/133 |
| 2001/0027133 | A1 | * 10/2001 | Kimura et al. | 464/32 |
| 2002/0124580 | A1 | * 9/2002 | Suitou et al. | 62/133 |
| 2002/0147531 | A1 | 10/2002 | Egami et al. | |
| 2003/0097848 | A1 | * 5/2003 | Egami | 62/133 |
| 2003/0213252 | A1 | * 11/2003 | Kuribayashi | 62/133 |

FOREIGN PATENT DOCUMENTS

WO       WO 97/49938      * 12/1997      ............. F16H/3/54

* cited by examiner

*Primary Examiner*—Marc Norman
(74) *Attorney, Agent, or Firm*—Harness, Dickey & Pierce, PLC

(57) ABSTRACT

A composite auxiliary machine for a vehicle and an accompanying control unit to control a compressor. The composite auxiliary machine for a vehicle includes a compressor for compressing refrigerant, a rotary machine that acts as an electric motor and a generator, and a torque and power distributing mechanism for distributing engine torque and power from a drive shaft to a compressor shaft and a rotary machine shaft, and from the rotary machine shaft to the drive shaft and compressor shaft. An intermittent mechanism is provided to the torque and power distributing mechanism so as to connect and disconnect any two of the drive shaft, the compressor shaft, and the rotary machine shaft. A locking mechanism is provided for restricting rotation of the compressor shaft. The compressor includes variable displacement mechanism for varying the amount of discharge per turn of the compressor shaft.

11 Claims, 9 Drawing Sheets

COMPOSITE AUXILIARY MACHINE FOR VEHICLE AND CONTROL UNIT THEREOF

CROSS REFERENCE TO RELATED APPLICATIONS

This application is based upon, claims the benefit of priority of, and incorporates by reference, the contents of Japanese Patent Application No. 2002-125858 filed Apr. 26, 2002 and No. 2002-164359 filed Jun. 5, 2002.

BACKGROUND OF THE INVENTION

1. Field of the Invention

The present invention relates to a composite auxiliary machine for a vehicle and a control unit thereof that are suitably applied to a refrigeration cycle device installed in a vehicle having an idling-stop function which automatically shuts off the engine when the vehicle stops.

2. Description of the Related Art

Vehicles incorporating the "idling-stop" function for better fuel economy have appeared on the market in recent years. With idling-stop the engine automatically shuts off when the vehicle stops moving, without turning off the ignition. In a conventional vehicle this means that the air-conditioning stops working during the stop because the compressor of the refrigeration cycle device also stops when the power from the engine is stopped.

The present inventors have shown a composite auxiliary machine for a vehicle in Japanese Patent Application No. 2001-111054 that can resolve this problem. This composite auxiliary machine for a vehicle combines an electric motor/generator with a compressor, and incorporates a torque distributing mechanism which is connected to the engine, motor/generator, and compressor respectively via engaging shafts. A locking mechanism is provided to the engaging shaft of the compressor, and a clutch is provided between the engaging shafts of the electric motor/generator and compressor.

This system not only allows the powering of the compressor by the electric motor/generator during stoppage of the engine but also enables flexible operation of the electric motor/generator and compressor in accordance with the operational state of the engine. The system also achieves simplification of its construction by integrating the electric motor/generator and its drive circuit.

Nevertheless, there is still a need for further improvement in the above invention with respect to the complexity in controlling both the locking mechanism and the clutch when regulating the operational performance of the compressor.

SUMMARY OF THE INVENTION

In view of the foregoing, an object of the present invention is to provide a composite auxiliary machine for a vehicle and a control unit thereof by which performance control of the compressor is readily achieved. To achieve the above object, the present invention employs the following technical means.

According to a first aspect of the present invention, a composite auxiliary machine for a vehicle includes a compressor (140) for compressing a refrigerant in a refrigeration cycle device (200), a rotary machine (130) functioning as a generator and as an electric motor, and a torque distributing mechanism (150) for distributing torque of a drive shaft (112). The drive shaft (112) is rotated by a driving force of a vehicle engine (10).

The torque distributing mechanism (150) distributes torque to a compressor shaft (142) of the compressor (140) and to a shaft (132) of the rotary machine (130), and distributes torque input from the shaft (132) of the rotary machine (130) to the drive shaft (112) and to the compressor shaft (142). Additionally, an intermittent means (120) provided to the torque distributing mechanism (150) connects and disconnects any two of the drive shaft (112), the compressor shaft (142), and the shaft (132) of the rotary machine (130). A locking mechanism (160) restricts rotation of the compressor shaft (142). The compressor (140) includes a variable displacement mechanism (145, 148) for varying an amount of discharge per turn of the compressor shaft.

In this composite auxiliary machine (100) for a vehicle, the intermittent means (120) is connected while the vehicle engine (10) is running, so that torque is transmitted from the drive shaft (112) to the compressor shaft (142) and the shaft (132) of the rotary machine (130) via the torque distributing mechanism (150) and the compressor (140) and the rotary machine (130) are activated simultaneously, whereby operation of the refrigeration cycle device (200) by the compressor (140) and power generation by the rotary machine (130) are both achieved.

While the compressor (140) is operating, the intermittent means (120) remains connected, and an amount of discharge of the compressor (140) is readily changeable in accordance with a predetermined thermal load of the refrigeration cycle device (200) by means of the variable displacement mechanism (145, 148). Because changing the amount of discharge does not involve switching the intermittent means (120), favorable drivability is achieved.

When the vehicle engine (10) is stopped, the intermittent means (120) is disconnected, and the rotary machine (130) is operated as an electric motor and provides power to the compressor (140) through the torque distributing mechanism (150). This permits the compressor (140) to continue providing air-conditioning. In this state also, in which the intermittent means (120) is disconnected, an amount of discharge of the compressor (140) is readily changeable by means of the variable displacement mechanism (145).

Operating the rotary machine (130) as an electric motor in this state with the intermittent means (120) being disconnected and the compressor shaft (142) being restricted by the locking mechanism (160), will rotate the drive shaft via the torque distributing mechanism (150) thereby restarting the vehicle engine (10).

According to a second aspect of the invention, a planetary gear (150) should preferably be used as the torque distributing mechanism (150). When the intermittent means (120) is connected while the engine (10) is running, because of the characteristics of the planetary gear (150), both the compressor shaft (142) and the shaft (132) of the rotary machine (130) rotate with the same rpm as that of the drive shaft. Accordingly, the rotary machine (130) can carry on stable power generation without being affected by changes in the amount of discharge of the compressor (140).

According to a third aspect of the invention, the locking mechanism (160) may be a one-way clutch (160) that allows forward rotation of the compressor shaft (142) and inhibits reverse rotation of the same. Thereby, the locking of the compressor shaft (142) at the time of starting the engine (10) is performed mechanically. Thus the locking mechanism (160) requires no control, and can be simply constructed.

According to a fourth aspect of the invention, the drive shaft (112) is connected to a planetary carrier (152) of the planetary gear (150), the compressor shaft (142) is connected to a ring gear (153) of the planetary gear (150), the shaft (132) of the rotary machine (130) is connected to a sun gear (151) of the planetary gear (150), and the intermittent means (120) is disposed between the drive shaft (112) and the compressor shaft (142). Thereby, the rotary machine (130) can be constructed compactly and when working as an electric motor, it can provide the same level of power to the compressor (140) or to the vehicle engine (10) at reduced rpm but with increased torque transmission.

According to a fifth aspect of the invention, a limiter mechanism (170) is interposed between the torque distributing mechanism (150) and the compressor shaft (142) for discontinuing the torque transmission between the drive shaft (112) and the compressor shaft (142) and between the shaft (132) of the rotary machine (130) and the compressor shaft (142) when the compressor (140) is locked. Thereby, even if the compressor (140) should be locked for some reason, the vehicle engine (10) and the rotary machine (130) are protected. Therefore, functions related to the drive are not impaired.

According to a sixth aspect of the invention, the limiter mechanism (170) should preferably be disposed closer to the compressor (140) than the one-way clutch (160). Thereby, even when the limiter mechanism (170) is working, the one-way clutch (160) can still restrict the compressor shaft (142) for starting the vehicle engine (10).

The torque distributing mechanism (150) is a significant component as it achieves torque transmission, and thus needs to have good reliability in terms of durability. Therefore, according to a seventh aspect of the invention, the torque distributing mechanism (150) should preferably be located inside an enclosed space (150b), and the drive shaft (112), the shaft (132) of the rotary machine (130), and the compressor shaft (142) should preferably be provided with sealing members (300a–300d) at portions extending into the enclosed space (150b).

Thereby, pre-applied lubrication oil in the torque distributing mechanism (150) is prevented from leaking outside of the enclosed space (150b), and with this lubrication oil retained inside the space, the reliability and durability of the torque distributing mechanism (150) is improved. This arrangement also prevents reliability degradation of the rotary machine (130) or the intermittent means (120) caused by contamination of the rotary machine (130) and intermittent means (120) with lubrication oil, particularly when the rotary machine (130) is a brush type and the intermittent means (120) performs connection and disconnection functions by friction.

According to an eighth aspect of the invention, the intermittent means (120) may be a clutch (120a, 120b) that works with lubrication oil and that is located inside the enclosed space (150b) together with the torque distributing mechanism (150). In such a case, the reliability of both the torque distributing mechanism (150) and the clutch (120a, 120b) is improved because of the retained lubrication oil.

According to a ninth aspect of the invention, the rotary machine (130) may be a brushless rotary machine (130) and be located inside the enclosed space (150b) together with the torque distributing mechanism (150). In this case, oil seals (300b) for the shaft (132) of the rotary machine (130) can be omitted.

According to a tenth aspect of the invention, the intermittent means (120) is a clutch (120a, 120b) that works with lubrication oil. The rotary machine (130) is a brushless rotary machine (130), and the intermittent means (120), the rotary machine (130), and the torque distributing mechanism (150) are supplied with the refrigerant.

With such a construction, the rotary machine (130) is cooled by the refrigerant, and will have better durability. It can also be constructed more compactly. Because the rotary machine (130) is of a brushless type, there is no risk that lubrication oil in the refrigerant will cause trouble to power supplied elements. Also, the torque distributing mechanism (150) and clutch (120a, 120b) will benefit from the lubrication oil in the refrigerant and will thereby have better durability and operability.

According to an eleventh aspect of the present invention, a control unit of a composite auxiliary machine for a vehicle has a function of automatically shutting off its vehicle engine (10) in accordance with its driving state. The control unit includes the composite auxiliary machine for a vehicle as set forth in any one of the first to tenth aspects, and control means (190) for controlling operations of the variable displacement mechanism (145, 148), the rotary machine (130), and connection and disconnection of the intermittent means (120).

The control of the composite auxiliary machine for a vehicle includes connecting the intermittent means (120) while the vehicle engine (10) is running, disconnecting the intermittent means (120) while the vehicle engine (10) is not running, and causing the rotary machine (130) to rotate in a reverse direction so as to operate as an electric motor for driving the compressor (140). Additionally, control consists of disconnecting the intermittent means (120) when starting the vehicle engine (10), causing the rotary machine (130) to rotate in a forward direction so as to operate as an electric motor for starting the vehicle engine (10), and operating the variable displacement mechanism (145, 148) while the compressor (140) is operating to change an amount of discharge of the compressor (140) in accordance with a predetermined thermal load of the refrigeration cycle device (200).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention. Reference numerals described in each of the above means correspond with means of the preferred embodiments described later.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

(First Embodiment)

FIG. 1 to FIG. 4 illustrate a first embodiment of the present invention. First, its specific structures will be described with reference to FIG. 1 and FIG. 2.

Figure 1:
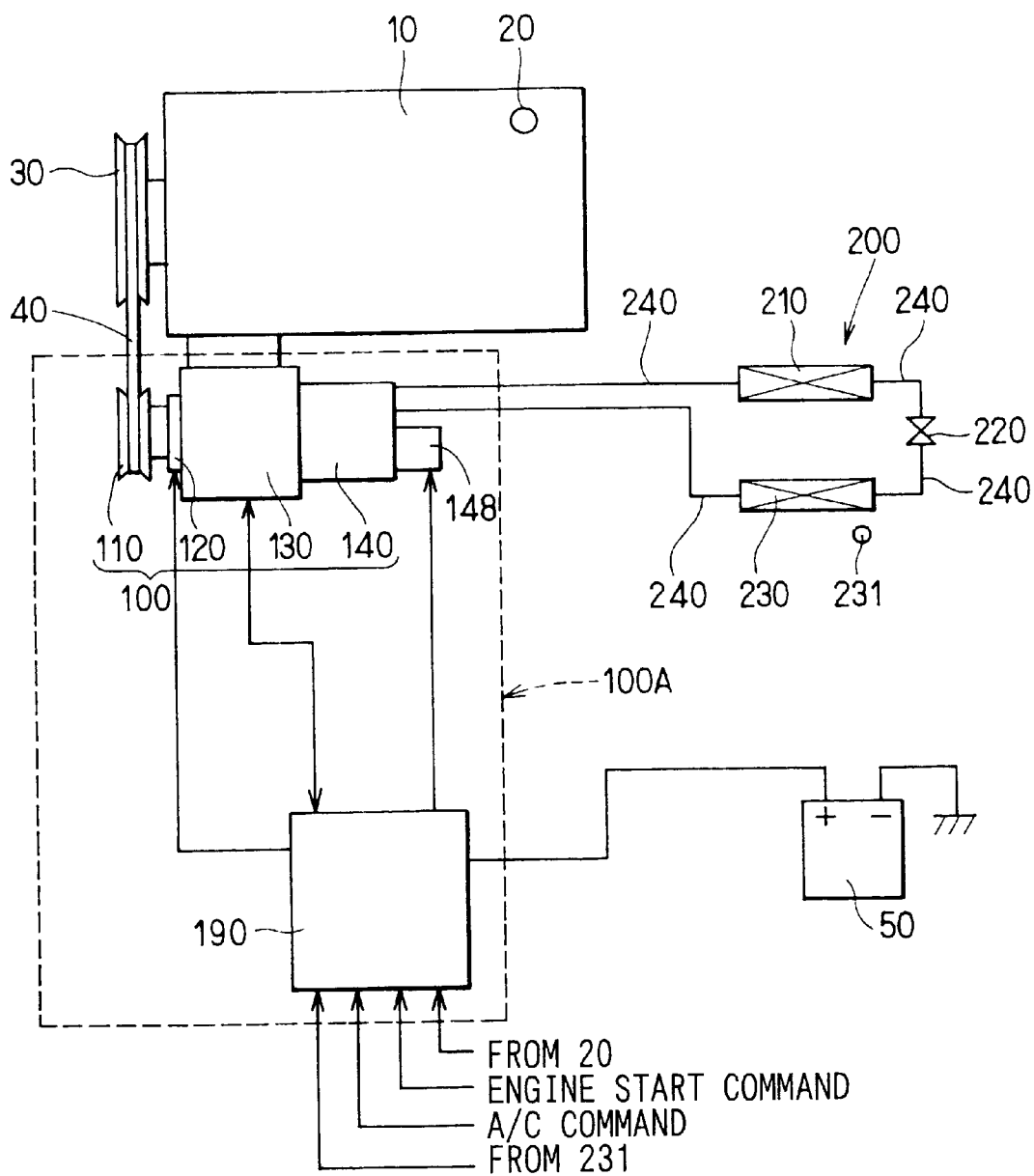
FIG. 1 is a diagram illustrating construction of a first embodiment of the present invention as applied to a refrigeration cycle device in a vehicle having an idling-stop function.

Reference numeral 100A in FIG. 1 denotes a control unit of a composite auxiliary machine for a vehicle, which includes a composite auxiliary machine for a vehicle (hereinafter "composite auxiliary machine") 100 and a controller 190. This embodiment shows one example in which the control unit 100A is applied to a refrigeration cycle device 200 mounted on a vehicle having the idling-stop function, which shuts off the vehicle engine 10 when the vehicle comes to a rest. The engine 10 includes an rpm sensor 20.

The refrigeration cycle device 200 includes a compressor 140 that is part of the composite auxiliary machine 100, and creates therein a known refrigeration cycle. The compressor 140 compresses the refrigerant in the cycle to a high temperature, high pressure gas. A refrigerant piping system 240 connects the following elements to the compressor 140 to form a closed loop: a condenser 210 for condensing and liquidizing the compressed refrigerant, an expansion valve 220 for allowing the liquid refrigerant to expand in a thermally insulating manner, and an evaporator 230 for evaporating the expanded refrigerant, thereby absorbing latent heat of vaporization and cooling the air passing therethrough.

A temperature sensor 231 is provided on the downstream side of the air flow of the evaporator 230 for detecting the temperature (Te) of the cooled air behind the evaporator. An A/C command signal carries information of the temperature set by a vehicle occupant, and the difference between the air temperature Te behind the evaporator and the set temperature is used as a representative value of the thermal load of the refrigeration cycle device 200. The larger the difference between the air temperature Te behind the evaporator and set temperature is, the larger the thermal load of the refrigeration cycle device 200 is, i.e., required amount of refrigerant discharged from the compressor 140 is increased.

The composite auxiliary machine 100 is made up integrally of a drive pulley 110, an electromagnetic clutch 120 as intermittent means, a rotary machine 130 (auxiliary machine), and the compressor 140 (auxiliary machine). A more detailed description will be given below with reference to FIG. 2.

The drive pulley 110 is fixed to a drive shaft 112 at the center by a nut 113. The drive shaft 112 is rotatably supported by a bearing 111 disposed at one end of the housing 131 of the rotary machine, so that the driving force from the engine 10 is transmitted as a rotating force through a crank pulley 30 and a belt 40 shown in FIG. 1 to the drive pulley 110.

On the other side of the drive pulley of the drive shaft 112 is provided a planetary gear 150 which constitutes a torque distributing mechanism. The planetary gear 150 includes, as is well known, a sun gear 151 at the center, a planetary carrier 152 revolved therearound by pinion gears 152a on the outer periphery of the sun gear 151, and a ring gear 153 arranged on the outer peripheral side of the pinion gears 152a. One end of the drive shaft 112 on the opposite side of the drive pulley is connected to the planetary carrier 152.

The rotary machine 130 is a "motor/generator" that can function both as a generator and an electric motor, and is comprised of a stator 135 with coils 135a fixed on an inner peripheral face of the housing 131, and a rotor 136 with a permanent magnet 136a on its outer periphery rotatably supported by a bearing 133 fixed to the housing 131. An outer peripheral portion on one side of the rotor 136 is connected to the ring gear 153 of the planetary gear 150. This means that the shaft 132 of the rotary machine 130 is connected to the ring gear 153 because it passes through the center of the bearing 133 as indicated by a two-dot chain line in FIG. 2. The bearing 133 rotatably supports the rotor 136.

An intermediate shaft 153c is rotatably supported by bearings 153a, 153b fixed on an inner side face of the housing 131 of the rotary machine. Its one end on the side of the drive pulley 110 is connected to the sun gear 151 of the planetary gear 150. Provided at the other end of the intermediate shaft 153c opposite the sun gear is a one-way clutch 160. The one-way clutch 160 forms a locking mechanism, and fixed to the housing 131 of the rotary machine, it allows forward rotation of the intermediate shaft 153c and inhibits its reverse rotation by altering states of engagement therebetween.

The compressor 140 is a variable displacement compressor of a swash plate type having a swash plate 145 and a control valve 148 for changing its amount of discharge. The discharge amount of refrigerant is made variable by changing the amount of discharge per turn of the compressor shaft. The discharge amount of refrigerant is expressed by a product of the amount of discharge and rpm of the compressor 140.

The compressor shaft 142 is rotatably supported by bearings 143, 144 fixed to the compressor housing 141. The swash plate 145 is mounted on the compressor shaft 142 and is located inside a swash plate chamber 145b. A plurality of pistons 147 are coupled to the outer periphery of the swash plate 145 via shoes 145a.

Figure 2:
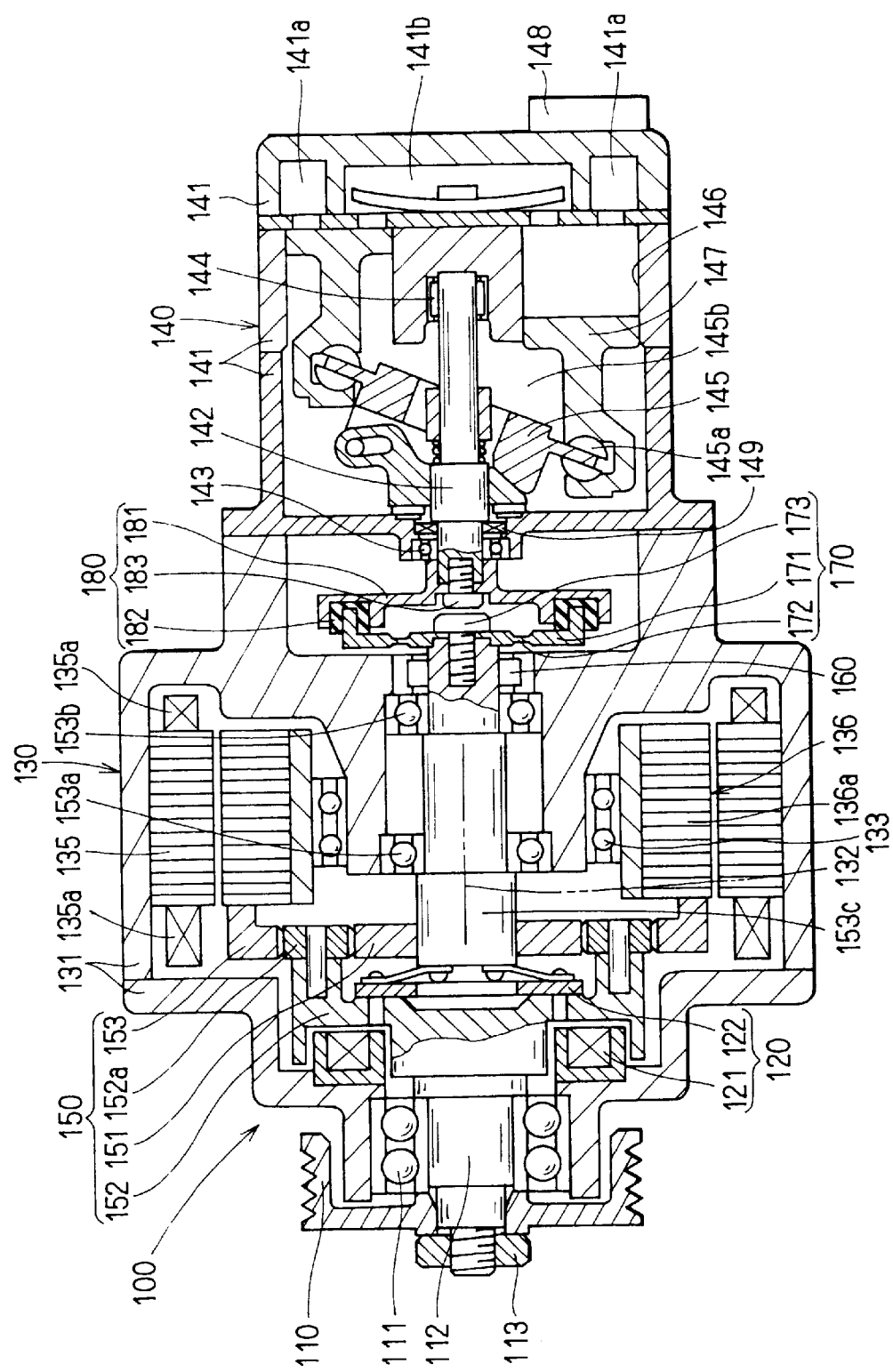
FIG. 2 is a cross-sectional view of the composite auxiliary machine for a vehicle of FIG. 1.

At one end of the compressor 140 on the right side of FIG. 2 is disposed the control valve 148, which controls pressure inside the swash plate chamber 145b by adjusting the degree of opening, thereby distributing the pressure inside a discharge chamber 141b into the swash plate chamber 145b or releasing the pressure inside the swash plate chamber 145b into a suction chamber 141a. The inclination angle of the swash plate 145 changes in accordance with the pressure, and so does the stroke of the pistons 147, whereby the amount of discharge is varied.

The inclination angle of the swash plate 145 can be changed continuously. When the angle is at maximum level as shown in FIG. 2, the stroke of the pistons 147 is the largest, whereby a maximum amount of discharge of the compressor 140 is attained. When the inclination angle of the swash plate 145 is at a minimum level where it is substantially orthogonal to the compressor shaft 142, the stroke of the pistons 147 is the smallest and the amount of discharge then is almost zero.

The intermediate shaft 153c and the compressor shaft 142 are connected to each other via a limiter mechanism 170 and a damping assembly 180. The limiter mechanism 170 includes a disk-like member 171 formed with a thin portion 172 at its radial center and fastened to the intermediate shaft 153c by a bolt 173. The thin portion 172 breaks when, while the outer periphery of the disk-like member 171 is fixedly held, a torque of more than a predetermined value is applied to the central portion of the limiter mechanism 170 via the intermediate shaft 153c.

The damping assembly 180 includes a disk-like member 181 and a resilient member 182 made of rubber or the like melt-bonded to the outer periphery of the disk-like member 181. It is fastened to the compressor shaft 142 by a bolt 183. Torque variations during the operation of the compressor 140 are absorbed by this resilient member 182 and thus are not transmitted to the rotary machine 130 side.

The resilient member 182 of the damping assembly 180 is further melt-bonded to the outer periphery of the disk-like member 171 of the limiter mechanism 170 so that the intermediate shaft 153c and compressor shaft 142 are connected to each other. The compressor shaft 142 is thus connected to the sun gear 151 of the planetary gear 150 through the intermediate shaft 153c. The limiter mechanism 170 is located closer to the compressor 140 than the one-way clutch 160.

To prevent the refrigerant inside the compressor housing 141 from leaking toward the rotary machine 130 side, a sealing assembly 149 is provided on the side of the bearing 143 of the compressor shaft 142. The planetary gear 150 is provided with an electromagnetic clutch 120 which acts as intermittent means for connecting and disconnecting the drive shaft 112 to and from, respectively, the intermediate shaft 153c, i.e., the drive shaft 112 and compressor shaft 142. The electromagnetic clutch 120 includes coils 121 fixed to the housing 131 of the rotary machine and a hub 122 connected to an end face of the intermediate shaft 153c. The planetary carrier 152 of the planetary gear 150 is located in between these coils 121 and the hub 122.

Figure 3:
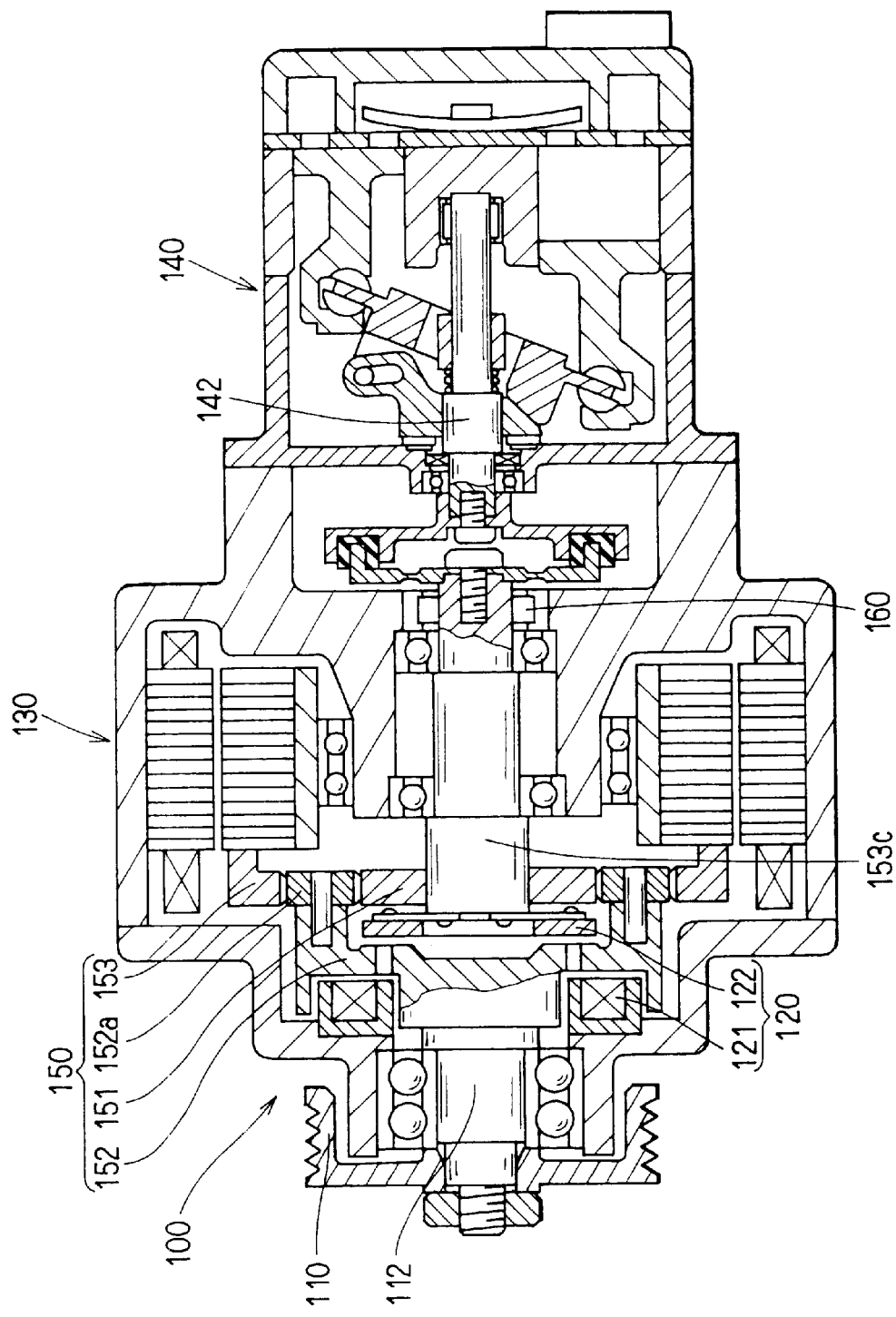
FIG. 3 is a cross-sectional view of the composite auxiliary machine for a vehicle of FIG. 2 in which the electromagnetic clutch is disengaged.

When the electromagnetic clutch 120 is turned on, i.e., when electric current is applied to the coils 121, the hub 122 is attracted toward and touches the planetary carrier 152, thereby engaging the drive shaft 112 with the intermediate shaft 153c and compressor shaft 142. When the electromagnetic clutch 120 is turned off, i.e., when the current supply to the coils 121 is cut off, the hub 122 moves away from the planetary carrier 152, whereby the intermediate shaft 153c and compressor shaft 142 are disconnected from the drive shaft 112. FIG. 3 illustrates this state.

Referring back to FIG. 1, the controller 190 processes various information such as a signal from the rpm sensor 20 indicating the rpm of the engine 10, an engine start command signal, an A/C command signal, and a signal from the temperature sensor 231 indicating the air temperature behind the evaporator, and determines the thermal load of the refrigeration cycle device 200 based on these signals. At the same time the controller 190 determines the state of the traveling vehicle and controls the operations of the electromagnetic clutch 120, rotary machine 130, and variable displacement mechanism 145, 148 of the compressor 140 as required.

Figure 4:
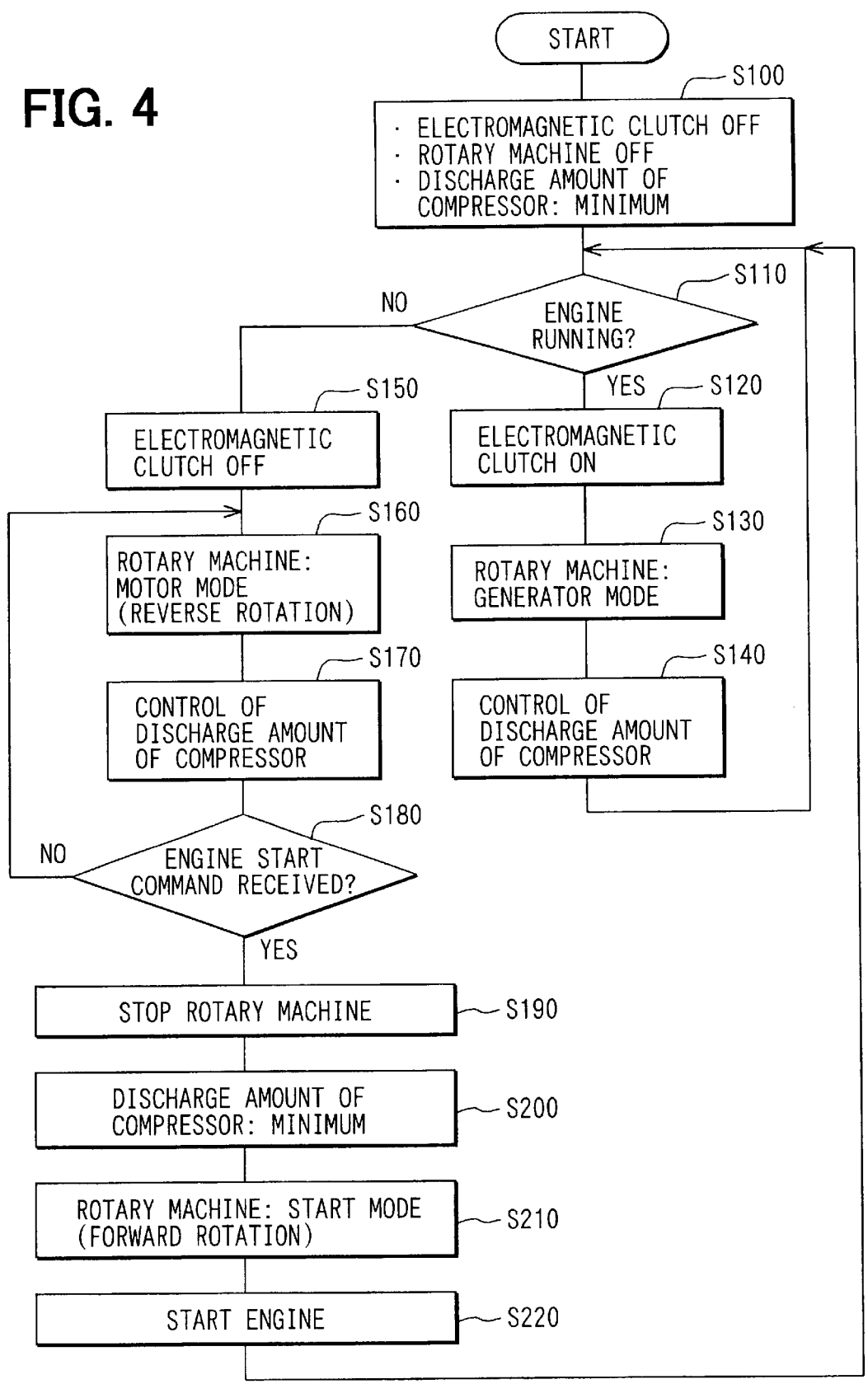
FIG. 4 is a flow chart of the control of the composite auxiliary machine for a vehicle.

The following is a description of control by the controller 190 and operation of the composite auxiliary machine 100 with reference to the flowchart of FIG. 4. The initial settings at step S100 are that the electromagnetic clutch 120 is turned off, the rotary machine 130 is turned off, and the amount of discharge of the compressor 130 is zero or minimal.

At step S110, the controller judges whether the engine 10 is running or not based on a detection signal from the rpm sensor 20. If the rpm is more than zero, the rotary machine 130 and the compressor 140 are activated using the driving force from the engine 10.

That is, the electromagnetic clutch 120 is turned on at the next step S120 so as to connect the drive shaft 112 and compressor shaft 142, whereby the latter is rotated with the same rpm as the drive shaft 112. Because the rotor 136 (and the shaft 132 of the rotary machine) connected to the planetary gear 150 is also rotated with the same rpm, this is followed by step S130, a power generation mode, in which the rotary machine 130 acts as a generator, and the battery 20 is charged with an electric current generated in the stator 135. Since the amount of discharge of the compressor 140 at this time is zero or minimal, the torque required to activate the compressor 140 is minimal, so the electromagnetic clutch 120 is turned on smoothly without causing shock.

At step S140, the amount of discharge of the compressor 140 is varied. Specifically, the degree of opening of the control valve 148 and the inclination angle of the swash plate 145 are adjusted, so as to change the stroke of the pistons 147, to attain a required discharge amount of refrigerant in accordance with the thermal load of the refrigeration cycle device 200. The steps S110–S140 are repeated when the engine 10 is running.

If the controller determines that the engine rpm is zero, i.e., the engine 10 is at a halt due to the idling-stop function at step S110, then it begins powering the compressor 140 by the rotary machine 130. The electromagnetic clutch 120 is turned off at step S150, and power is supplied from the battery 50 to the coils 135a of the stator 135 at step S160, whereby the rotor 136 is rotated. Thus the compressor 140 is operated through the planetary gear 150 by the rotary machine 130 acting as an electric motor. Since the engine 10 is stopped and the drive shaft 112 is stationary, the compressor 140 is operated in the forward direction by rotating the rotor 136 or the shaft 132 of the rotary machine in the reverse direction.

At step S170, the amount of discharge of the compressor 140 is varied similarly to step S140, so as to attain a required discharge amount of refrigerant in accordance with the thermal load of the refrigeration cycle device 200. In this idling-stop state, if an engine start command signal is input, the control of the rotary machine 130 is executed in the following sequences S190–S210 to start the engine 110.

First, the rotary machine 130 is stopped at step S190. In addition, the amount of discharge of the compressor 140 is set to be zero or minimal at step S200, so that the electromagnetic clutch 120 can be turned on smoothly without causing shock the next time round. At step S210, the rotary machine 130 is rotated in the forward direction so that it functions as an electric motor or starter. While the compressor shaft 142 tries to rotate in the reverse direction via the planetary gear 150 in this engine start mode, its rotation is inhibited by the one-way clutch 160. Thus the drive shaft 112 alone is rotated by the electric motor, whereby the engine 10 is started at step S220. If no engine start command has been input at step S180, steps S160 and S170 are to be repeated.

To summarize, the characteristic features of the composite auxiliary machine 100 and its control unit 100A according to the present invention are as follows: while the engine 10 is running, it provides power to the compressor 140 and the rotary machine 130, because the electromagnetic clutch 120 enables torque transmission from the drive shaft 112 to the compressor shaft 142 and the shaft 132 of the rotary machine via the planetary gear 150, and so the compressor 140 operates the refrigeration cycle device 200 and the rotary machine 130 performs power generation. While the compressor 140 is working, the electromagnetic clutch 120 remains in the ON-state, and the amount of discharge can be varied in accordance with the thermal load of the refrigeration cycle device 200 by controlling the variable displacement mechanism 145, 148. Since no switching of the electromagnetic clutch 120 is necessary during this time, good drivability is achieved.

The planetary gear 150 has characteristics that enable both the compressor shaft 142 and the shaft 132 of the rotary machine to rotate with the same rpm as that of the drive shaft 112 when the electromagnetic clutch 120 is turned on. Accordingly, the rotary machine 130 can carry on stable power generation without being affected by changes in the amount of discharge of the compressor 140.

When the engine 10 is stopped, the electromagnetic clutch 120 is turned off, so that the rotary machine 130 acts as an electric motor, by which the compressor 140 is operated via the planetary gear 150 to provide continuous air-conditioning. Variable control of the amount of discharge by the variable displacement mechanism 145, 148 is also possible while the electromagnetic clutch 120 is in the OFF-state.

To restart the engine 10, the rotary machine 130 is operated as an electric motor, with the electromagnetic clutch 120 being turned off, and the compressor shaft 142 being restricted in one direction by the one-way clutch 160. Thus the drive shaft 112 is rotated via the planetary gear 150 to start the engine 10. Because the locking mechanism is constructed with the one-way clutch 160, the locking of the compressor shaft 142 at the time of restarting the engine 10 is performed mechanically. Thus the locking mechanism requires no control, and can be simply constructed.

Furthermore, because of the limiter mechanism 170 provided between the planetary gear 150 and the compressor shaft 142 closer to the compressor than the one-way clutch 160, should the compressor 140 be locked for some reason, the engine 10 and the rotary machine 130 are protected, so that deterioration of driving performance is not experienced. Even when the limiter mechanism 170 is working, the one-way clutch 160 can still restrict the compressor shaft 142 when restarting the engine 10.

(Second Embodiment)

Figure 5:
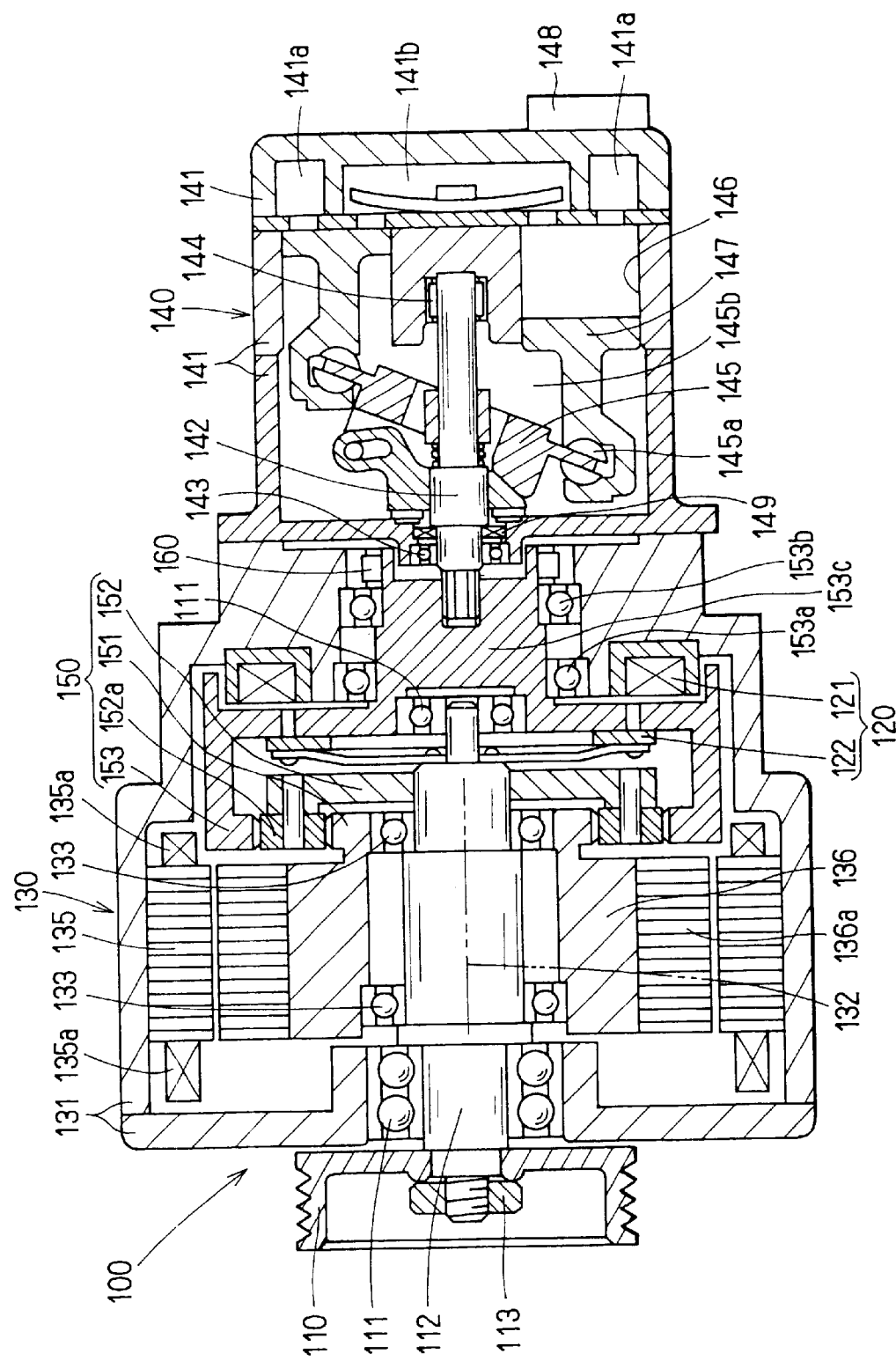
FIG. 5 is a cross-sectional view of a composite auxiliary machine for a vehicle according to a second embodiment.

FIG. 5 illustrates a second embodiment of the present invention, in which the arrangement of the shaft 132 of the rotary machine and the compressor shaft 142 relative to the planetary gear 150 is different from that of the foregoing embodiment. The rotor 136 or the shaft 132 of the rotary machine 130 is connected to the sun gear 151 of the planetary gear 150, and the intermediate shaft 153c is connected to the ring gear 153 of the planetary gear 150. The limiter mechanism 170 and the damping assembly 180 present in the previous embodiment are omitted here and the intermediate shaft 153c is directly connected to the compressor shaft 142.

This arrangement enables the rotary machine 130 to be constructed more compactly, because when working as an electric motor, it can provide the same level of power to the compressor 140 or to the engine 10 at reduced rpm with increased torque transmission.

(Third Embodiment)

Figure 6:
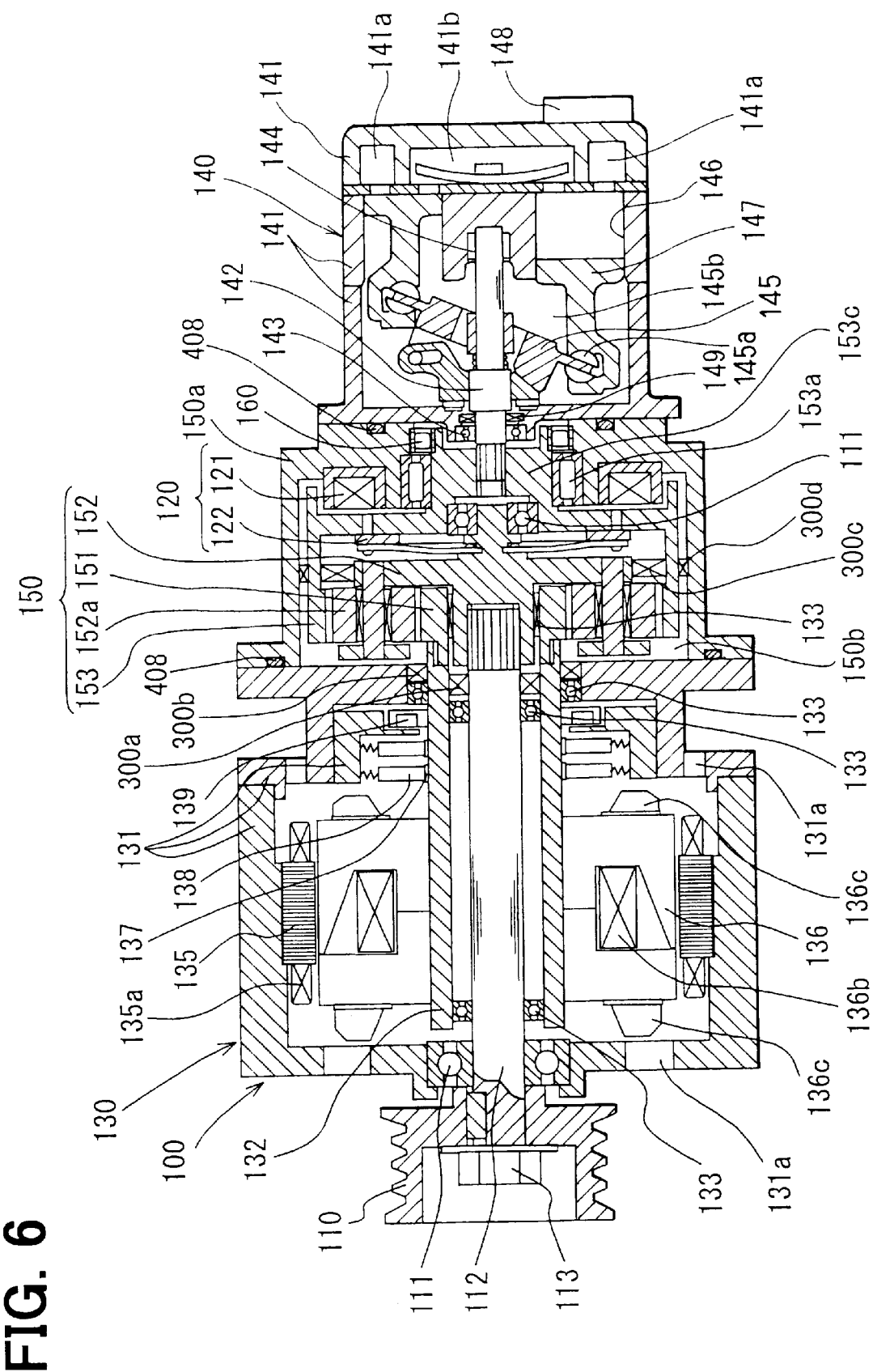
FIG. 6 is a cross-sectional view of a composite auxiliary machine for a vehicle according to a third embodiment.

FIG. 6 illustrates a third embodiment of the present invention, in which part of the structure of the rotary machine 130 is changed, and in which the planetary gear 150 is placed in an enclosed space 150b as compared to the second embodiment.

The shaft 132 of the rotary machine is cylindrical and supported rotatably by bearings 133. The rotary machine 130 is a brush-type, having a brush 138 in contact with a slip ring 137 electrically connected to coils 136b of the rotor 136. Power generation control of the rotary machine 130 having this generator structure is easier. An angle sensor 139 is attached to the shaft 132 for detecting the rotation angle position of the rotor 136, so that electric current is supplied to the rotary machine 130 when it is working as an electric motor in accordance with the rotation angle position of the rotor 136 to achieve a required rotation speed. A plurality of fans 136c are provided on side faces of the rotor 136, and a plurality of air-cooling apertures 131a are formed at either end of the housing 131 of the rotary machine, so that outside air will pass through the inside of the housing 131 for air cooling while the rotary machine 130 is in operation.

The planetary gear 150 is accommodated in an enclosed space 150b inside a middle housing 150a between the housing 131 of the rotary machine and the housing 141 of the compressor. Sealing members such as oil seals 300a and 300b are respectively provided at portions where the drive shaft 112 and the shaft 132 of the rotary machine extend into the enclosed space 150b inside the middle housing 150a. Also, oil seals 300c and 300d are provided to the ring gear 153 connected to the compressor shaft 142 between the planetary gear 150 and the electromagnetic clutch 120. Between the housing 131 of the rotary machine and the middle housing 150a, and between the middle housing 150a and the housing 141 of the compressor are provided respective packings 408 for seals.

Thereby, pre-applied lubrication oil in the planetary gear 150 is prevented from leaking outside of the enclosed space 150b. With the lubrication oil well retained inside the space 150b, the reliability and durability of the planetary gear 150 is improved. This arrangement also prevents reliability degradation of rotary machine 130 and electromagnetic clutch 120 caused by contamination of the brush 138 and electromagnetic clutch 120 with lubrication oil.

Figure 7:
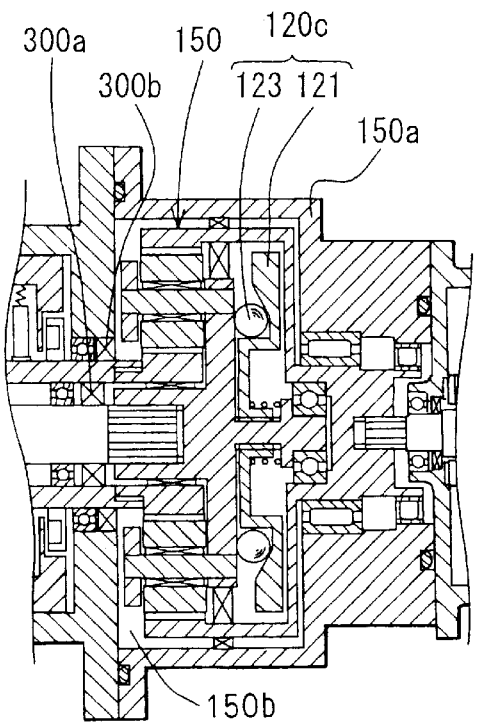
FIG. 7 is a cross-sectional view of a modified example 1 of the composite auxiliary machine for a vehicle of the third embodiment.

The electromagnetic clutch 120 may be constructed as a centrifugal clutch as shown in FIG. 7, in which the connecting and disconnecting of shafts are achieved by balls 123 that move toward an outside diameter by centrifugal force. This structure is simpler and less expensive.

(Fourth Embodiment)

Figure 8:
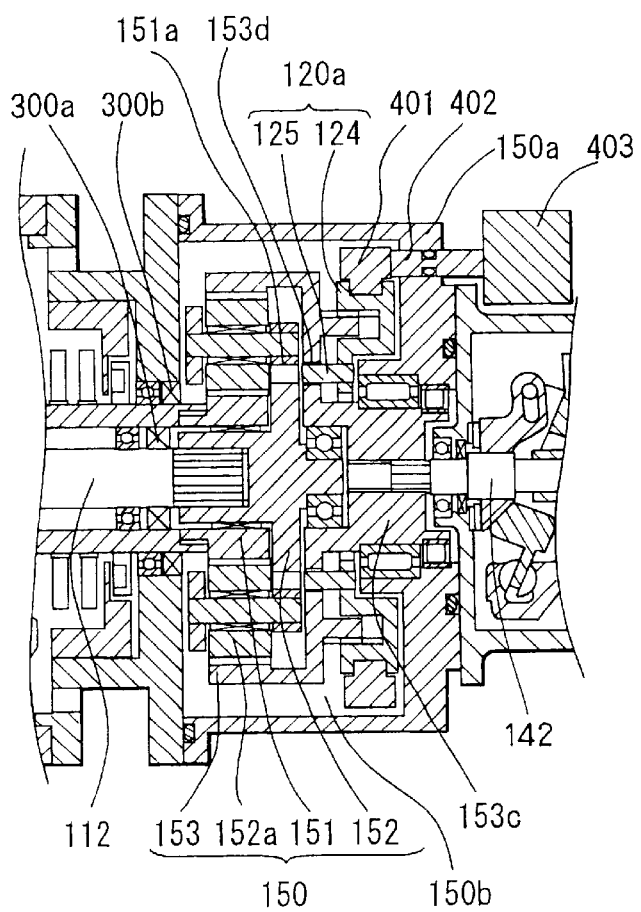
FIG. 8 is a cross-sectional view of a composite auxiliary machine for a vehicle according to a fourth embodiment.

FIG. 8 illustrates a fourth embodiment, in which the clutch used as intermittent means is a lubricated mechanical clutch 120a as compared to the third embodiment. The mechanical clutch 120a includes a sleeve 124, a plurality of pins 125 fitted thereto, and a shift fork 401 coupled to an outer peripheral portion of the sleeve. The shift fork 401 is joined to a rod 402, which is moved by an actuator 403 to cause the sleeve 124 to slide in an axial direction of the intermediate shaft 153c.

The ring gear 153 of the planetary gear 150 has insertion holes 153d opposite the pins 125, in which the pins 125 are fitted. The sun gear 151 has engaging holes 151a opposite the pins 125. When the sleeve 124 slides towards the sun gear 151, the pins 125 fit into the holes 151a, whereby the sun gear 151 and the ring gear 153 are engaged with each other, and the drive shaft 112 and compressor shaft 142 are connected to each other.

Because the mechanical clutch 120a achieves the engaging and disengaging of both shafts by a sliding movement and engagement, lubrication oil is pre-applied to the mechanical clutch 120a for ensuring its reliability in terms of performance and durability. It is also located in the enclosed space 150b inside the middle housing 150a together with the planetary gear 150.

Therefore, the lubrication oil of the mechanical clutch 120a is well retained as with the planetary gear 150, and they both have improved reliability. Moreover, because the oil seals 300c and 300d provided between the planetary gear 150 and clutch as in the third embodiment are omitted, a cost reduction is achieved.

Figure 9:
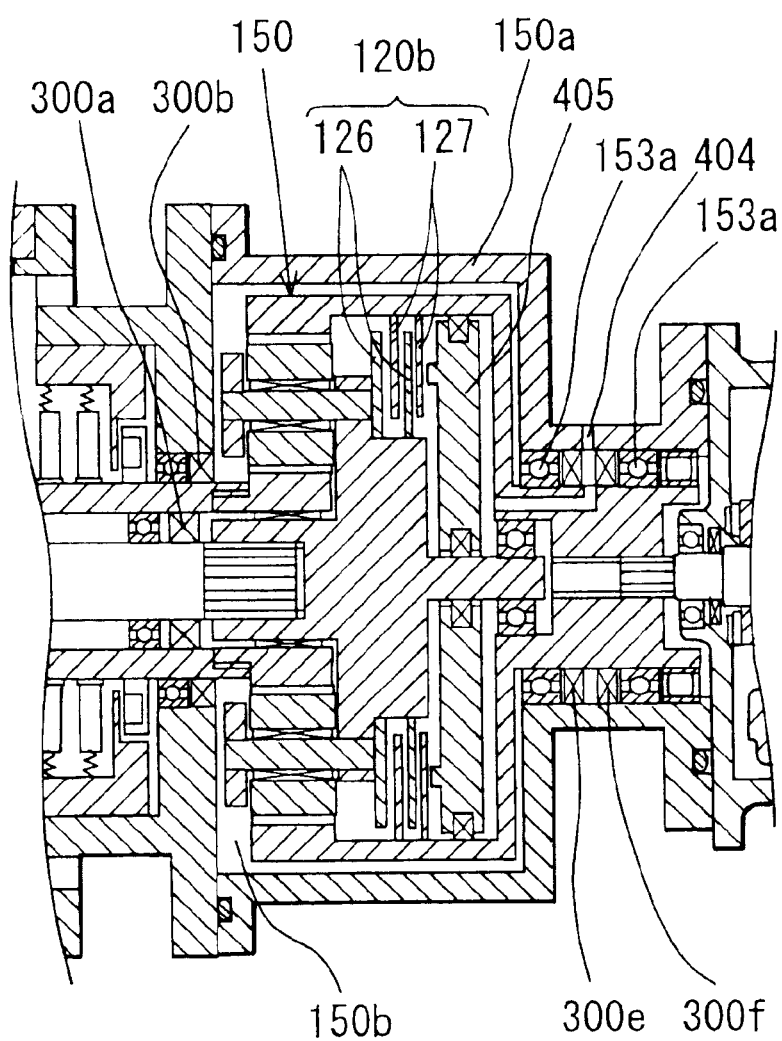
FIG. 9 is a cross-sectional view of a modified example of the composite auxiliary machine for a vehicle of the fourth embodiment.

The mechanical clutch 120a may also be a wet multi-plate clutch 120b as shown in FIG. 9, in which a number of plates 126 and 127 provided to the sun gear 151 and the ring gear 153, respectively, perform the connecting and disconnecting functions. The same effects as described above will thereby be achieved.

The plates 126 and 127 of the wet multi-plate clutch 120b work with lubrication oil, as is well known. They are moved by a piston 405 which is slid by oil pressure applied through an inlet 404 provided with oil seals 300e and 300f.

(Fifth Embodiment)

Figure 10:
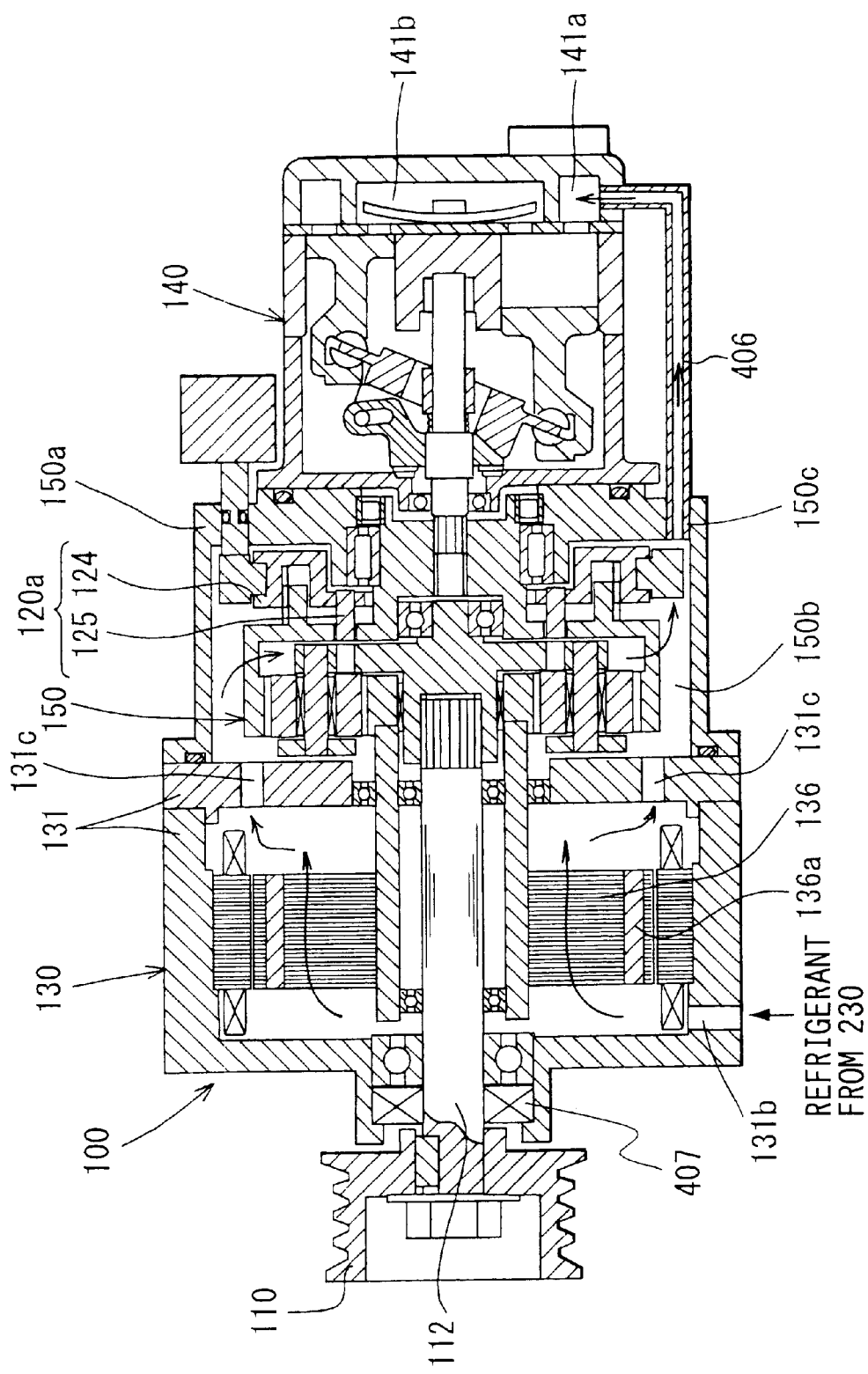
FIG. 10 is a cross-sectional view of a composite auxiliary machine for a vehicle according to a fifth embodiment.

FIG. 10 illustrates a fifth embodiment of the present invention in which refrigerant from the refrigeration cycle device 200 is supplied to the rotary machine 130, the planetary gear 150, and the mechanical clutch 120a.

The composite auxiliary machine 100 has basically the same structure as in the fourth embodiment. The housing 131 of the rotary machine and the middle housing 150a are respectively formed with apertures 131b, 131c and 150c for refrigerant. The aperture 150c communicates to the suction chamber 141a of the compressor 140 through a linking passage 406. The aperture 131b communicates to the evaporator 230 of the refrigeration cycle device 200. A lip seal 407 is provided at the end of the drive shaft 112 on the side of the drive pulley 110 for forming an air tight seal.

The rotary machine 130 is a brushless type, whose rotor 136 has a permanent magnet 136a and requires no power supply. The intermittent means is the mechanical clutch 120a as with the fourth embodiment. Refrigerant from the evaporator 230 flows into the rotary machine 130 through the aperture 131b, and further into the enclosed space 150b inside the middle housing 150a through the aperture 131c. In the enclosed space 150b inside the middle housing 150a the planetary gear 150 and mechanical clutch 120a are located. The refrigerant then flows into the suction chamber 141a of the compressor 140 through the aperture 150c and the linking passage 406.

The rotary machine 130 is thus cooled by the refrigerant, which permits the rotary machine 130 to be more durable. It can also be compactly constructed. Because the rotary machine 130 is a brushless type, there is no risk that lubrication oil in the refrigerant will cause trouble to elements that receive power.

The planetary gear 150 and the mechanical clutch 120a will benefit from the lubrication oil in the refrigerant. They will thereby have better durability and operability. As an alternative, the refrigerant may be circulated from the discharge chamber 141b of the compressor 140 into the enclosed space 150b in the middle housing 150a and inside the rotary machine 130.

(Other Embodiments)

Various other modifications can be made to the above embodiments. For example, a differential gear mechanism may be employed as the torque distributing mechanism in place of the planetary gear 150. The electromagnetic clutch 120 may not necessarily be provided between the drive shaft 112 and the compressor shaft 142, but between the drive shaft 112 and the shaft 132 of the rotary machine, or between the compressor shaft 142 and the shaft 132 of the rotary machine.

An internal component that constitutes the rotary machine 130 may be accommodated inside the enclosed space 150b in the middle housing 150a together with the planetary gear 150. By adopting a brushless type rotary machine, the oil seal 300b for the shaft 132 of the rotary machine can be omitted.

The present invention can be applied not only to the vehicles having the idling-stop function but also to gasoline-electric hybrid vehicles and other vehicles. The torque distributing mechanism is described as a means which distributes the torque, however, it may be a mechanism that distributes power. Therefore, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A composite auxiliary machine for a vehicle, comprising:
    a compressor for compressing a refrigerant in a refrigeration cycle device;
    a rotary machine that functions as a generator and as an electric motor;
    a torque and power distributing mechanism for distributing torque of a drive shaft rotated by a driving force of a vehicle engine to a compressor shaft of said compressor and to a shaft of said rotary machine, and for distributing torque and power input from said shaft of the rotary machine to said drive shaft and to said compressor shaft;
    intermittent means provided to said torque and power distributing mechanism for connecting and disconnecting any two of said drive shaft, said compressor shaft, and said shaft of the rotary machine; and
    a locking mechanism for restricting rotation of said compressor shaft, wherein
        said compressor includes a variable displacement mechanism for varying an amount of discharge per turn of the compressor shaft.

2. The composite auxiliary machine for a vehicle according to claim 1, wherein said torque and power distributing mechanism is a planetary gear.

3. The composite auxiliary machine for a vehicle according to claim 1, wherein said locking mechanism is a one-way clutch that permits forward rotation of said compressor shaft and inhibits reverse rotation of said compressor shaft.

4. The composite auxiliary machine for a vehicle according to claim 2, wherein
    said drive shaft is connected to a planetary carrier of said planetary gear,
    said compressor shaft is connected to a ring gear of said planetary gear,
    said shaft of the rotary machine is connected to a sun gear of said planetary gear, and
    said intermittent means is disposed between said drive shaft and said compressor shaft.

5. The composite auxiliary machine for a vehicle according to claim 1, further comprising:
    a limiter mechanism interposed between said torque and power distributing mechanism and said compressor shaft, wherein the limiter mechanism discontinues the torque and power transmission between said drive shaft and said compressor shaft and between said shaft of the rotary machine and said compressor shaft (142), when said compressor is locked.

6. The composite auxiliary machine for a vehicle according to claim 5, wherein said limiter mechanism is disposed closer to said compressor than said one-way clutch.

7. The composite auxiliary machine for a vehicle according to claim 1, wherein said torque and power distributing mechanism is located inside an enclosed space, and said drive shaft, said shaft of the rotary machine, and said compressor shaft are provided with sealing members at portions extending into said enclosed space.

8. The composite auxiliary machine for a vehicle according to claim 7, wherein said intermittent means is a clutch that works with lubrication oil and is located inside said enclosed space together with said torque and power distributing mechanism.

9. The composite auxiliary machine for a vehicle according to claim 8, wherein said rotary machine is a brushless rotary machine and is located inside said enclosed space together with said torque and power distributing mechanism.

10. The composite auxiliary machine for a vehicle according to claim 1, wherein said intermittent means is a clutch that works with lubrication oil, said rotary machine is a brushless rotary machine, and said intermittent means, said rotary machine, and said torque and power distributing mechanism are supplied with said refrigerant.

11. A control unit of a composite auxiliary machine for a vehicle having a function of automatically shutting off its vehicle engine in accordance with its driving state, the control unit including the composite auxiliary machine for a vehicle according to claim 3, and control means for controlling operations of said variable displacement mechanism, said rotary machine, and said intermittent means, wherein said control means executes a control method of the composite auxiliary machine for a vehicle, the method comprising the steps of:

connecting said intermittent means while said vehicle engine is running;

disconnecting said intermittent means while said vehicle engine is not running, and causing said rotary machine to rotate in a reverse direction so as to operate as an electric motor for driving said compressor;

disconnecting said intermittent means when starting said vehicle engine, and causing said rotary machine to rotate in a forward direction so as to operate as an electric motor for starting said vehicle engine; and operating said variable displacement mechanism while the compressor is working to change an amount of discharge of said compressor in accordance with a predetermined thermal load of said refrigeration cycle device.

* * * * *